United States Patent [19]

Tinker

[11] Patent Number: 4,836,284

[45] Date of Patent: Jun. 6, 1989

[54] EQUILIBRIUM FRACTURE ACIDIZING

[75] Inventor: Steven J. Tinker, Houston, Tex.

[73] Assignee: Shell Western E&P Inc., Houston, Tex.

[21] Appl. No.: 148,525

[22] Filed: Jan. 26, 1988

[51] Int. Cl.$^4$ .................... E21B 41/02; E21B 43/267; E21B 43/27

[52] U.S. Cl. .................................. 166/279; 166/307; 166/308

[58] Field of Search ............... 166/279, 280, 282, 307, 166/308, 271

[56] References Cited

U.S. PATENT DOCUMENTS

| | | | |
|---|---|---|---|
| Re. 30,484 | 1/1981 | Broaddus et al. | 166/307 |
| 2,596,843 | 5/1952 | Farris | 166/307 |
| 3,160,206 | 12/1964 | Jorda . | |
| 3,552,494 | 1/1971 | Kiel | 166/308 |
| 3,642,068 | 2/1972 | Fitch et al. | 166/307 |
| 3,768,564 | 10/1973 | Knox et al. | 166/307 |
| 3,842,911 | 10/1974 | Knox et al. | 166/307 |
| 3,885,630 | 5/1975 | Richardson | 166/307 |
| 3,918,524 | 8/1976 | Broaddus et al. | 166/307 |
| 3,998,272 | 1/1976 | Maly | 166/281 |
| 4,044,833 | 8/1977 | Volz | 166/307 |
| 4,078,609 | 3/1978 | Pavlich | 166/271 |
| 4,172,041 | 10/1979 | Clampitt et al. | 166/307 X |
| 4,245,702 | 1/1981 | Haafkens et al. | 166/307 |
| 4,428,432 | 1/1984 | Pabley | 166/307 X |
| 4,442,897 | 4/1984 | Crowell | 166/280 |
| 4,471,840 | 9/1984 | Lasseter et al. | 166/280 |
| 4,482,016 | 11/1984 | Richardson | 166/300 |
| 4,566,539 | 1/1986 | Perlman | 166/280 |
| 4,741,400 | 5/1988 | Underdown | 166/279 |

OTHER PUBLICATIONS

"Stimulating Carbonate Formations Using a Closed Fracture Acidizing Technique", S. E. Fredrickson, Halliburton Services, Society of Petroleum Engineers, 1986, SPE 14654, pp. 43–50.

"How to Engineer a Fracturing Treatment", by Michael J. Economides, SPE, Dowell Schlumberger, Journal of Petroleum Technology, Nov. 1987, SPE 17176, pp. 1343–1345.

"Determination of Proppant and Fluid Schedules From Fracturing-Pressure Decline", by K. G. Nolte, SPE, Society of Petroleum Engineers, 1986, SPE Production Engineering, Jul. 1986, pp. 255–265.

"Design of Acid Fracturing Treatments", by B. B. Williams and D. E. Nierode, Journal of Petroleum Technology, Jul. 1972, pp. 849–859.

"The Effect of Flow on Acid Reactivity in a Carbonate Fracture", by A. N. Barron, A. R. Hendrickson, and D. R. Wieland, Journal of Petroleum Technology, Apr. 1962, pp. 409–415.

Primary Examiner—George A. Suchfield
Attorney, Agent, or Firm—Denise Y. Wolfs

[57] ABSTRACT

A method of fracture acidizing whereby fluid is initially injected at a high rate and pressure, sufficient to create a fracture of desired dimensions in a formation, subsequently injected at a lower rate and pressure, sufficient to approximately maintain equilibrium with any fluid that leaks off from the fracture created and such that the fracture remains open without further extension, and finally contacting the fracture with acid to etch flow channels in the formation.

40 Claims, 3 Drawing Sheets

FIG.1
PRE-STIMULATION FRACTURE TEST

FIG.2 FRACTURE REOPENING TEST

FIG. 3
BASE AND POST TREATMENT TEMPERATURE LOG

EQUILIBRIUM FRACTURE ACIDIZING

BACKGROUND OF THE INVENTION

The present invention relates to methods of fracture acidizing underground well formations, and more particularly to a new method of fracture acidizing whereby flow channels are etched to increase the production of oil, gas, and the like from the well formation.

Many methods have been developed and used successfully for increasing or stimulating the production of oil, gas, and the like from well formations. One commonly used method of well stimulation, where the producing formation is formed of acid soluble rock of relatively low permeability, is known in the art as fracture acidizing. The method consists of exerting fluid pressure on the formation to create one or more fractures therein, and then extending the created fracture outwardly from the well bore, often as far as possible. Either during the creation of the fracture, or after the fracture has been created, the faces of the fracture are exposed to acid. The acid may be pumped continuously or in stages, alternating with non-acidic, usually viscous liquid. High conductivity passageways for fluid flow to the well are created by the non-uniform acid reaction with the fracture faces, due to heterogeneous rock composition or fingering of the acid through the alternating stages of non-acidic, viscous liquid. The action of the acid on the faces of the fracture is often called etching. Non-uniform acid reaction with the faces of the fracture produces differential etching. In some treatment techniques, the fracture is allowed to close between multiple acid-treatment cycles. Once the desired acid volume has been pumped, or the desired contact time has been achieved, the well is returned to service.

Applicant is not aware of any prior art which, in his judgment as one skilled in the fracture acidizing art, would anticipate or render obvious the fracture acidizing process of the present invention. The following patents are described for the purpose of fully developing the background of the invention. U.S. Pat. No. 3,768,564 discloses a process known as Closed Fracture Acidizing, wherein fractures are allowed to close prior to prolonged contact with the acid. Flow channels are etched while the fracture is held open, then expanded only after the fracture is allowed to close. This process is also described in "Stimulating Carbonate Formations Using a Closed Fracture Acidizing Technique" by S. E. Fredrickson, a paper prepared for the Society of Petroleum Engineers East Texas Regional Meeting, held in Tyler, Tex., Apr. 21-22, 1986 (SPE 14654). U.S. Pat. No. 3,842,911 describes the use of propping agents in the Closed Fracture Acidizing process. The formation is acidized after the fracture closes on the propping agents, allowing creation of flow channels a relatively long distance from the well bore. U.S. Pat. No. 3,885,630 discloses the use of a weak acid that reacts slowly to etch flow channels in the reservoir. The method is particularly applicable to high temperature reservoirs, where strong acids may react too quickly. U.S. Pat. No. 3,918,524 discloses an improved method of fracture acidizing wherein the treating fluid is prevented from underriding preflush or other fluids in the formation and is caused to contact the faces of the fractures over their entire heights and lengths. U.S. Pat. No. 4,245,702 describes a process of fracturing and acidizing a well with the use of propping agents that is particularly applicable to relatively hard formations. U.S. Pat. No. Res. 30,484 describes an improved method of fracture acidizing wherein the treatment is confined to a desired zone within the formation. U.K. Patent No. 2,163,790 describes a gelled acid composition and a process for using the gelled acid in a fracture acidizing process.

It is known in the art that to achieve maximum effectiveness of the fracture acidizing process, it is often desirable to maximize the time the fracture is exposed to the acid, while limiting the amount of acid used to an economically reasonable amount. However, in fracture acidizing procedures used heretofore, less than desired results have often been achieved when the acid exposure time is maximized. For example, where the fracture acidizing treatment of a well formation has been carried out by first creating a fracture in the formation and then continuing to inject acid into the fracture at a high rate and pressure, in one or several stages, the fracture faces adjacent to the well are exposed to the etching of a lot of acid for a relatively long period of time,, and yet the fracture faces furtherest from the well may have received insufficient acid contact, even after a large quantity of acid has been injected. In some formations, the longer the acid is allowed to etch the rock faces adjacent to the well, the more likely that those rock faces will become softened or overetched, so that upon closing, the faces will crush against each other, effectively destroying or restricting the flow channels created adjacent to the well. In other formations, which react more slowly, the acid contact time and effective acid penetration into the fracture may be insufficient to provide additional flow channels at a distance not adjacent to the well.

By the present invention, a new method of fracture acidizing a well formation is provided, wherein acid or other fracturing fluid is first injected into the formation at a high rate, sufficient to create a fracture of the desired dimensions, and then acid is injected at rates that are relatively lower, but still sufficient to maintain a pressure on the fracture that will hold the fracture open without significant further extension. The injection rate after fracturing is approximately in equilibrium with the rate at which fluids leak off from the fracture. The leak-off rate declines over time, and acid may be injected at low rates for a relatively long period of time. Consequently, it is possible to achieve a longer contact time while injecting a smaller total acid volume for a fracture of a given size, relative to conventional fracture acidizing techniques.

SUMMARY OF THE INVENTION

The process involves creating one or more fractures in a formation, reducing the pressure on the formation such that the fracture is held open without significant further extension, and contacting virtually the entire fracture surface area with acid flowed at rates sufficient to replace any fluids which leak off from the fracture, such that a flow rate equilibrium is approximately maintained. While the pressure on the fracture is held below the pressure at which the fracture was propagated in the formation, but above the pressure at which the fracture will close, the acid may flow through the fracture at a declining rate for a relatively long period of time, without significant further extension of the fracture. As the acid contacts the faces of the fracture, flow channels are etched in the fracture faces.

This invention is particularly applicable to any formation subject to acid etching, such as carbonate formations (including limestone and dolomite). The invention is most useful in hard formations or relatively cool formations, where the acid reaction proceeds slowly. It is also particularly valuable in oil-bearing formations which are bounded by water-bearing or gas-bearing formations, and where it is undesirable to provide conduits between these formations and the oil-bearing formations. In such formations, once a fracture of the desired dimensions is created, this invention allows for a large volume of acid to be pumped through the fracture, while preventing further fracturing or significant further extension of the fracture into the water-bearing or gas-bearing intervals.

This invention is also applicable to formations not subject to acid etching, such as sandstones, where it may be desirable to fracture the formation to insert proppants in the fracture, thus providing high conductivity flow channels. The same procedures may also be used for the placement of another fluid in the formation, such as scale or paraffin inhibitors, to protect or enhance flow to or from a well. Also, the invention is applicable both to injection wells and production wells.

Other purposes, advantages, and features of the invention will be apparent to one skilled in the art upon review of the following.

DESCRIPTION OF THE INVENTION

The present invention is, at least in part, based on the discovery that, after creating a fracture in a formation, reducing the fluid injection rate into the fracture to approximately maintain equilibrium with the rate at which any fluid leaks off from the fracture, or reducing the pressure on the fracture to less than the pressure at which the fracture will propagate (the fracture propagation pressure) but greater than the pressure at which the fracture will close (the fracture closeure pressure), will hold the fracture open without significant further extension of the fracture. Also, because acid can be continuously injected at a slow rate while the fracture is held open, a smaller total volume of acid can be used in the equilibrium fracture acidizing process to achieve a longer acid contact time than the time that can be achieved through conventional fracture acidizing methods, for a fracture of a given size.

In the present invention, a fluid is first injected into a formation at a rate and pressure high enough to initiate one or more fractures of desired dimensions in the formation. After creating a fracture of the desired dimensions, the fluid injection rate is reduced to the insitu fluid leak-off rate from the fracture faces. By maintaining the injection rate approximately in equilibrium with the in-situ leak-off rate, or maintaining a pressure on the fracture greater than the closure pressure but less than the propagation pressure, the fracture is held open without further fracturing or significant fracture extension. (In a fracture acidizing treatment, an extension of about an inch would not be considered significant, but an extension of about a foot or more would probably be considered significant.) Bottomhole pressure, measured with conventional well tools, or wellhead pressure, corrected for hydrostatic head and friction, may be used as a measure of the pressure on the fracture. Either a conventional fracturing fluid or acid may be used to initiate and propagate the fracture. If a fracturing fluid has been used, acid is injected subsequent to the pressure or injection rate reduction step. If acid has been used to initiate and propagate the fracture, acid injection is continued after the pressure or injection rate reduction step. In both cases, slow injection of the acid is used to etch flow channels on the fracture faces in the formation.

During the time that the fracture is held open, the in-situ leak-off rate will decline, at first rapidly, then more slowly. If the injection rate is periodically adjusted to hold the pressure on the fracture between the closure pressure and the propagation pressure for the fracture, injection can continue for the maximum amount of time before the fracture closes. With typical injection equipment, a minimum pumping rate will be reached before the minimum leak-off rate. By holding the fracture open, it is possible to flow fresh acid across the fracture faces for a relatively long period of time. It is possible to acidize the fracture, at low acid injection rates, for up to two to four hours, and even as long as six hours or more, with this process. Yet because of the low injection rates used, a smaller total volume of acid may be used to achieve a desired contact time for a fracture of a given size.

The increased acid contact time and/or lower acid volume use is illustrated in Table 1 below. The equilibrium fracture acidizing process is compared with a typical fracture acidizing process, where acid is pumped at fracturing rates, first to create a fracture, and then, in additional stages, to acidize the fracture. In Case 1, a total of 6,170 gallons of acid is used in each process to acidize the fracture, but the equilibrium fracture acidizing process provides more than three times as much acid contact time (240 minutes) than the typical process (about 74 minutes). In Case 2, an acid contact time of 240 minutes is achieved with each process, but the typical process uses a much larger quantity of acid (20,160 gallons), compared to the equilibrium fracture acidizing process (6,170 gallons) for the same fracture.

It is speculated that the low injection rates provide a more efficient use of the acid, because the acid is more likely to react with the rock, becoming spent, before it leaks off from the fracture. It is also speculated that, due to the low injection rates, the acid may penetrate virtually the entire fracture, such that etching occurs across the entire surface area of the fracture.

Some of the parameters required to design and control the fracture stimulation in the present method are measured in pre-stimulation field tests. Use of such tests to obtain representative data for fracture design is advocated in "How to Engineer a Fracturing Treatment," by M. J. Economides, a paper published in the *Journal of Petroleum Technology* in November 1987 (SPE 17176). By injecting a small volume of fluid at fracturing pressure into the target formation, creating a small fracture, observing the pressure decline after ceasing injection, and then either flowing the well back at a constant rate or reopening the created fracture at a low injection rate, the fracture closure pressure (the pressure below which the fracture closes, or above which the fracture reopens, commonly

TABLE 1
ILLUSTRATION OF ACID VOLUMES AND CONTACT TIMES

Fracture and Formation Parameters:
Fracture Radius: 80 feet

Total leak-off coefficient: .0005 ft/$\sqrt{min.}$
Young's Modulus: 6,000,000
Poisson's Ratio: 0.3
Fluid viscosity: 1 centipoise

| Equilibrium Fracture Acidizing | | Typical Fracture Acidizing | |
| --- | --- | --- | --- |
| Case 1: | | Case 1: | |
| Fracture propagation acid: 2,940 gallons (gal.) @ 2 bbls/min. (BPM) | = 35 min. | Fracture propagation acid: 2,940 gal. @ 2 BPM | = 35 min. |
| | | Additional acid stage: 2,940 gal @ 2 BPM | = 35 min. |
| Equilibrium acidizing: 3,230 gal @ rates 40 to 10 gal. per min. (GPM) | = 205 min. | Additional acid stage: 290 gal @ 2 BPM | = ~4 min. |
| Totals: | | Totals: | |
| Acid contact time | = 240 min. | Acid contact time | = ~74 min. |
| Acid volume used | = 6,170 gal. | Acid volume used | = 6,170 gal. |
| Case 2: | | Case 2: | |
| Fracture propagation acid: 35 min. @ 2 BPM | = 2,940 gal. | Fracture propagation acid: 35 min. @ 2 BPM | = 2,940 gal. |
| Equilibrium acidizing: 205 min. @ rates 40 to 10 GPM | = 3,230 gal. | Six additional acid stages: 6 @ 35 min. @ 2 BPM | = 14,700 gal. |
| | | One additional acid stage: 30 min. @ 2 BPM | = 2,520 gal. |
| Totals: | | Totals: | |
| Acid Volume used | = 6,170 gal. | Acid volume used | = 20,160 gal. |
| Acid contact time | = 240 min. | Acid contact time | = 240 min. | known as the minimum in-situ stress), and the fracture propagation pressure (the pressure at which a fracture will be created and propagated or extended within the formation) may be determined. The in-situ fluid leak-off coefficient is calculated from these pressures, the pressure response data from the field test, and properties of the fluids and formation tested.

These parameters are then used in a two-dimensional fracture growth simulation model to determine the injection rate and time (hence volume) required to create a fracture of the desired dimensions, and to calculate the in-situ leak-off rate from that fracture as a function of time elapsed since creation of the fracture. It is important to accurately determine the volume of acid or fracturing fluid required to create a fracture of desired dimensions, and the in-situ leak-off rate as a function of time after creating the fracture, to ensure that the desired results are achieved. Although all of these parameters can be estimated, performing field tests to accurately measure the fracture closure pressure, and the fracture propagation pressure, and using the field test data to calculate the in-situ fluid leak-off coefficient and to model fracture growth, will optimize results in performing the subject invention.

A preferred technique for carrying out the present invention for fracture acidizing is to first fracture the well formation a desired distance outwardly from the well by pumping a conventional fracturing fluid into the formation at a rate or pressure sufficient to cause the formation to fracture. The pumping is then reduced or stopped, and the pressure on the formation is lowered to below the fracture propagation pressure, but still above the fracture closure pressure. The lowering of the pressure on the formation causes the fracture or fractures to remain open, but without significant further extension of the fracture. After the formation has been fractured, and the pressure reduced, a quantity of acid is pumped into the fracture at a pressure greater than the closure pressure but less than the propagation pressure. During this step, the acid reacts with the rock faces of the fracture, causing channels to be etched therein. By holding the prssure on the fracture between the closure and propagation pressures, the fracture is held open without significant further extension, yet acid is allowed to contact virtually the entire surface of the fracture. Injection of a volume of acid sufficient to etch the fracture for the desired time period is followed by an aqueous solution, such as brine, to flush the acid from the well while the pressure is maintained between the closure and propagation pressures. The well is then returned to service.

An alternate technique, which may be employed for carrying out the present fracture acidizing invention, is to utilize acid for fracturing the formation as well as for etching the fracture faces. In this technique, either retarded or unretarded acid is first pumped into the formation through the well at a rate and pressure sufficient to cause the formation to fracture. The injection rate of the acid is then reduced to below the propagation pressure but above the closure pressure, so that the fracture is held open without significant further extension, and channels are etched in the fracture faces by the acid. Injection of a volume of acid sufficient to etch the fracture for the desired time period is followed by an aqueous solution, such as brine, to flush the acid from the well while the pressure is maintained above the closure pressure but below the propagation pressure. The well is then returned to service.

Another alternate technique, which may be employed for carrying proppants into a fracture, is creation of a fracture in the formation in a conventional manner, and placement of a propping agent in the fracture formed after the pressure reduction step. After the fracture has been formed and the pressure on the formation reduced to below the propagation pressure but greater than the closure pressure, a conventional propping agent, typically suspended in a fluid, is placed in the fracture. Conventional propping agents may be sand, bauxite, glass beads, metal shot, plastic particles, resin coated particles, walnut hulls, intermediate strength (between sand and bauxite) proppants, and other materials well known in the art. Propping agents are usually suspended in fluids such as gelled water, hydrocarbon-in-water emulsions, water-in-hydrocarbon emulsions, gelled hydrocarbons, high viscosity hydrocarbon liquids, and carbon dioxide, nitrogen, or other foams. Once the fracture is allowed to close, void spaces or channels will remain around the propping agents. It may then be desirable to pump acid into the formation to etch and enlarge flow channels in the fracture (if the formation is subject to acid etching), or the process may be used in formations which are not subject to acid etching, such as sandstones.

Alternatively, the same procedure could be used for placement of a flow-enhancing fluid in the formation, such as a scale inhibitor or a paraffin inhibitor, used to protect or enhance the production or injection capability of a well, where it is desirable to place such a fluid in a fracture, without further extending the fracture dimensions.

All the procedures described herein can also be used in a fractured formation that contains an existing fracture (or fractures), where the fracture is reopened, rather than created, as part of the treatment process. A fractured formation would include a formation containing an existing natural fracture, or existing man-made fracture, or a formation containing a combination of both natural and man-made fractures. In addition, any of the techniques described herein may be used in combination with any one or more of the other techniques described herein.

Any of a variety of conventional fracturing fluids may be employed in accordance with the present invention for initially creating a fracture in the formation. Examples of suitable fracturing fluids are water, gelled water, hydrocarbon-in-water emulsions, water-in-hydrocarbon emulsions, gelled hydrocarbons, high viscosity hydrocarbon liquids, and carbon dioxide, nitrogen, or other foams.

The acid initially injected into the fracture while it is held open may be retarded or unretarded, depending on the particular formation being treated and other factors. The etching action of the acid on the rock faces is controlled either by limiting the time the acid is allowed to remain in the fracture or the quantity of acid injected, so that channels are etched therein, but the fracture faces are not overetched or softened, thereby ensuring that portions remain intact to provide support when the fracture is closed. If a retarded acid has been used initially, it may be desirable to follow the retarded acid with injection of an unretarded acid.

Any of a variety of organic or inorganic acids may be utilized for carrying out the method of the present invention, provided such acids are capable of etching the particular formation to be treated. Preferred acids are aqueous solutions of acetic acid, citric acid, formic acid, hydrochloric acid, hydrofluoric acid, and mixtures thereof. The acids utilized may be retarded, for slowing the reaction rate of the acid on the formation, with conventional acid-retarding agents, or unretarded acids may be used. Gelled acids may also be used to slow the reaction rate and to transport fine particles generated by the acid reaction away from the well. Additionally, the acids may contain conventional corrosion inhibitors to protect metal surfaces contacted thereby, or other additives, such as iron sequestering chemicals, scale inhibitors, and paraffin solvents or inhibitors.

In order to present a clear understanding of the present invention, the above method will now be described in more detail by means of an example, with reference to the drawings herein. As will be understood, prior to treating a particular formation, it is desirable to perform conventional laboratory tests and calculations to determine formation rock properties, optimum treating fluid properties, etc. Also, preliminary modeling with known and/or assumed parameters, such as the total fluid leak-off coefficient, the fracture propagation and closure pressures, Young's modulus, and Poisson's ratio, may be done to estimate the volume and injection rate of fluid required to fracture the formation. Such calculations are useful in designing both the pre-stimulation field tests and the actual fracture acidizing operation, as well as in evaluating the economic justification for performing the operation. The quantities and types of the various treating fluids given in the example are for illustration purposes only and the present invention is not to be limited thereto.

EXAMPLES

To apply the present method, the fracture propagation pressure, the fracture closure pressure, and the in-situ fluid leak-off coefficient must be known or estimated. For optimum results, it is desirable to accurately determine these parameters by field testing in the target formation. The example below includes a description of the field testing (which is considered conventional) used to accurately determine these parameters.

Figure 1:
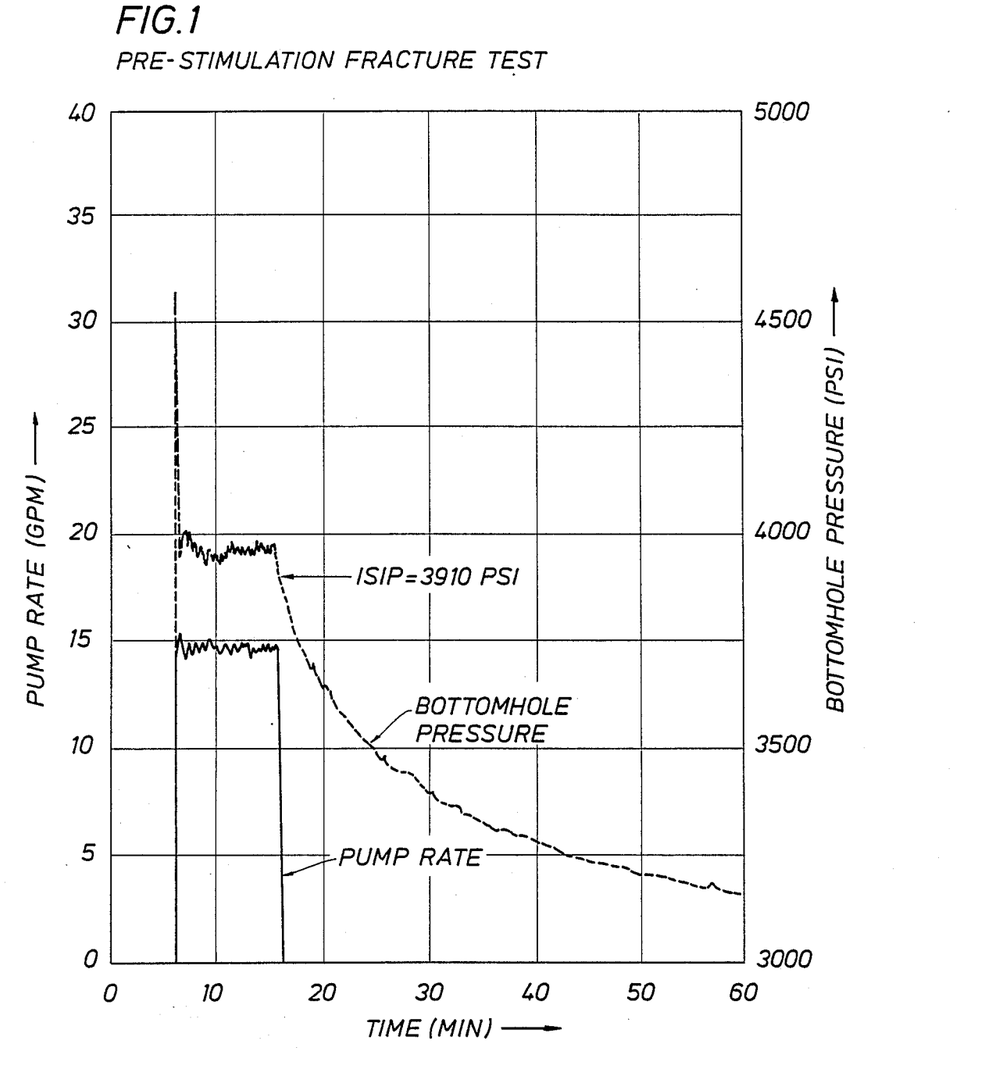
FIG. 1 is a plot of pressure and rate versus time for a typical pre-stimulation fracture test.

The results of a typical pre-stimulation fracture test, which can be used to determine the fracture propagation pressure, are shown in FIG. 1. A small volume of a low-viscosity brine was injected into the formation at a constant rate sufficient to initiate a small fracture, the well was then shut-in, and the pressure allowed to decline. The wellhead pressure and the fluid injection rate were monitored during the test. The wellhead pressures were converted to bottomhole pressures by considering the wellbore fluid's hydrostatic head and any frictional pressure drop caused by injection or flow. (Bottomhole pressure could have been directly measured with conventional downhole tools.) The calculated bottomhole pressures were used as a measure of the pressure on the formation or fracture. The instantaneous shut-in pressure (ISIP) was calculated from the wellhead pressure at the time the well was shut in. The ISIP is considered equal to the fracture propagation pressure, since frictional effects are usually negligible after injection is stopped. The wellhead pressure was monitored for about an hour after the well was shut-in. (A test fracture will usually close within this time.) Both the fracturing fluid injection rate and the calculated bottomhole pressure were plotted versus the elapsed time of the fracture test. FIG. 1 indicates that for this test, the ISIP, and therefore, the fracture propagation pressure are indicated at about 3,910 psi. The well's post shut-in pressure decline data were subsequently used in calculating the in-situ fluid leak-off coefficient.

Figure 2:
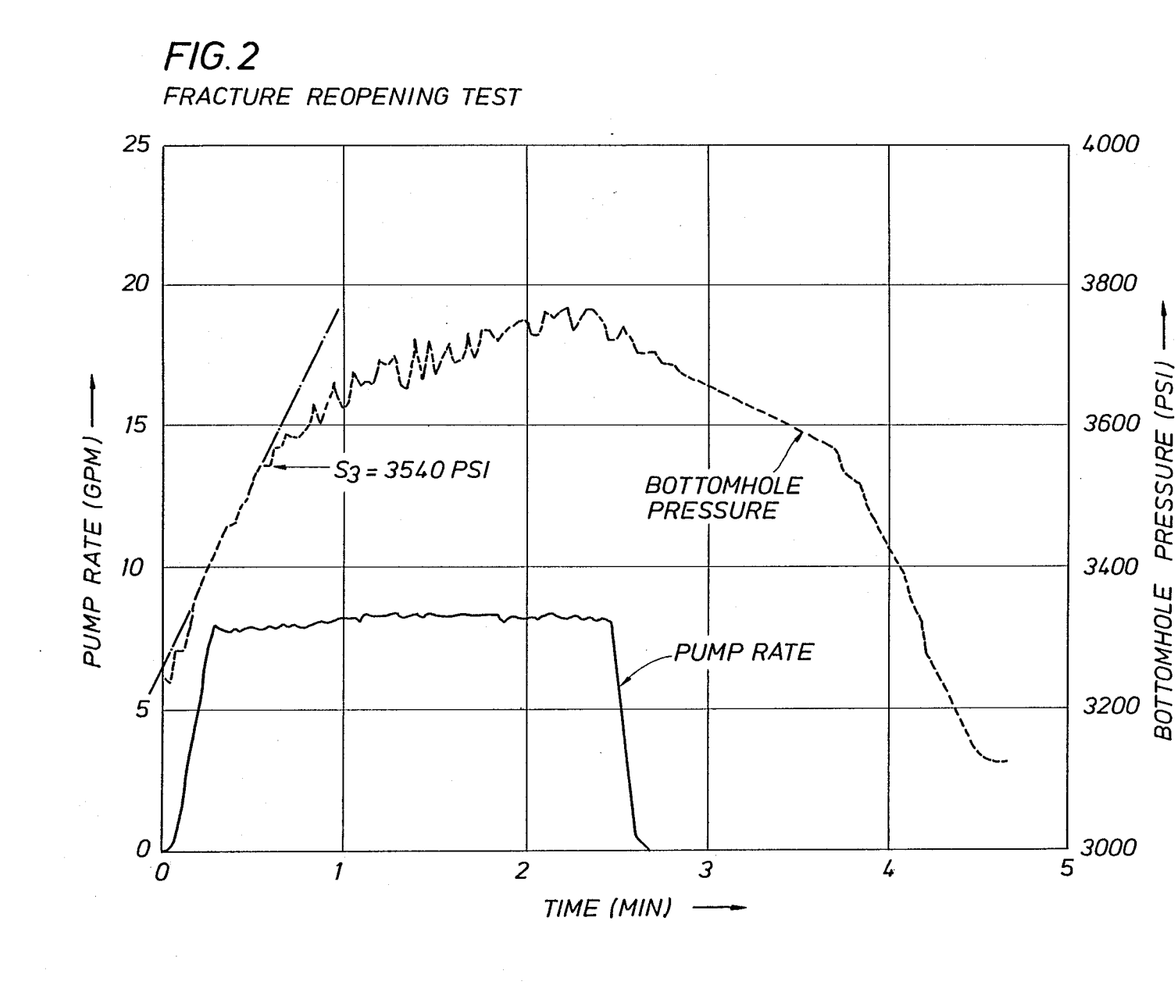
FIG. 2 is a plot of pressure and rate versus time for a typical fracture reopening test.

The results of a typical fracture reopening test, which can be used to determine the fracture closure pressure, are shown in FIG. 2. Brine was injected into the formation at a constant rate sufficient to reopen the small fracture. Wellhead pressures and fluid injection rates were again monitored during the test, and the wellhead pressures were converted to bottomhole pressures. Fracture reopening was indicated at about 3,540 psi, by the change in the rate at which the pressure increased.

The well was then shut-in and flowed back at an unknown rate. The pressure decline rate changed, indicating fracture closure, at about 3,410 psi, slightly below the fracture reopening pressure. Disregarding frictional effects, the fracture reopening pressure and the fracture closure pressure should be the same, and either one is considered a measure of the minimum in-situ stress. The lower measure of closure pressure was most likely caused by an irregular flowback rate. Because the reopening pressure was measured with a known, constant injection rate, the value of about 3,540 psi was considered more reliable, and was used in the treatment design for the fracture closure pressure.

The fracture propagation and closure pressures, the pressure response data for both the fracture test and the fracture reopening test, the formation's Young's Modulus and Poisson's Ratio, and the treatment fluid properties were used to determine the in-situ fluid leak-off coefficient for the formation. Then, all these values were used in a two-dimensional fracture growth model, to determine the injection volume required at a given rate to create a fracture of the desired dimensions. These parameters were also used to determine the leak-off rates for the fracture over time, which determined the maximum volume and time of acid contact that could be achieved for the fracture. In this example, it was determined that the in-situ leak-off coefficient was about 0.0005 ft/√min., and that an injection volume of 849 gallons of hydrochloric acid (28%) injected in 81 minutes (at 10½ GPM) was required to create a fracture with a height of 90 feet.

A fracture was created by injecting the required volume, as determined above, at the fracturing rate. Once the fracture was created, the acid injection rate was reduced to the initial in-situ leak-off rate from the fracture faces. After establishing the lower injection rate, the wellhead pressure was noted, and the injection rate was adjusted as necessary to maintain the bottomhole pressure at about half way between the fracture propagation pressure and the fracture closure pressure. During the time the fracture was held open, the in-situ leak-off rate declined, at first rapidly, then more slowly. Consequently, the acid injection rate was periodicaly adjusted to hold the pressure on the fracture about half way between the closure pressure and the propagation pressure, thereby keeping the fracture open without significant further extension. In this example, after injecting the required fracturing volume, about 1,150 gallons of additional hydrochloric acid (28%) were injected over about 165 mins. at rates from about 8 GPM to about 3½ GPM and at a bottomhole pressure between about 3,540 psi and about 3,910 psi, providing a total acid contact time of about four hours. With typical injection equipment, a minimum pumping rate will be achieved before the minimum leak-off rate. The acid was followed by brine, to flush the acid from the well and into the formation, while the injection pressure was maintained at a value between the fracture propagation pressure and the fracture closure pressure. After the acid was flushed from the well, the fracture was allowed to close, and a post-stimulation temperature log was run to measure the created fracture height.

Figure 3:
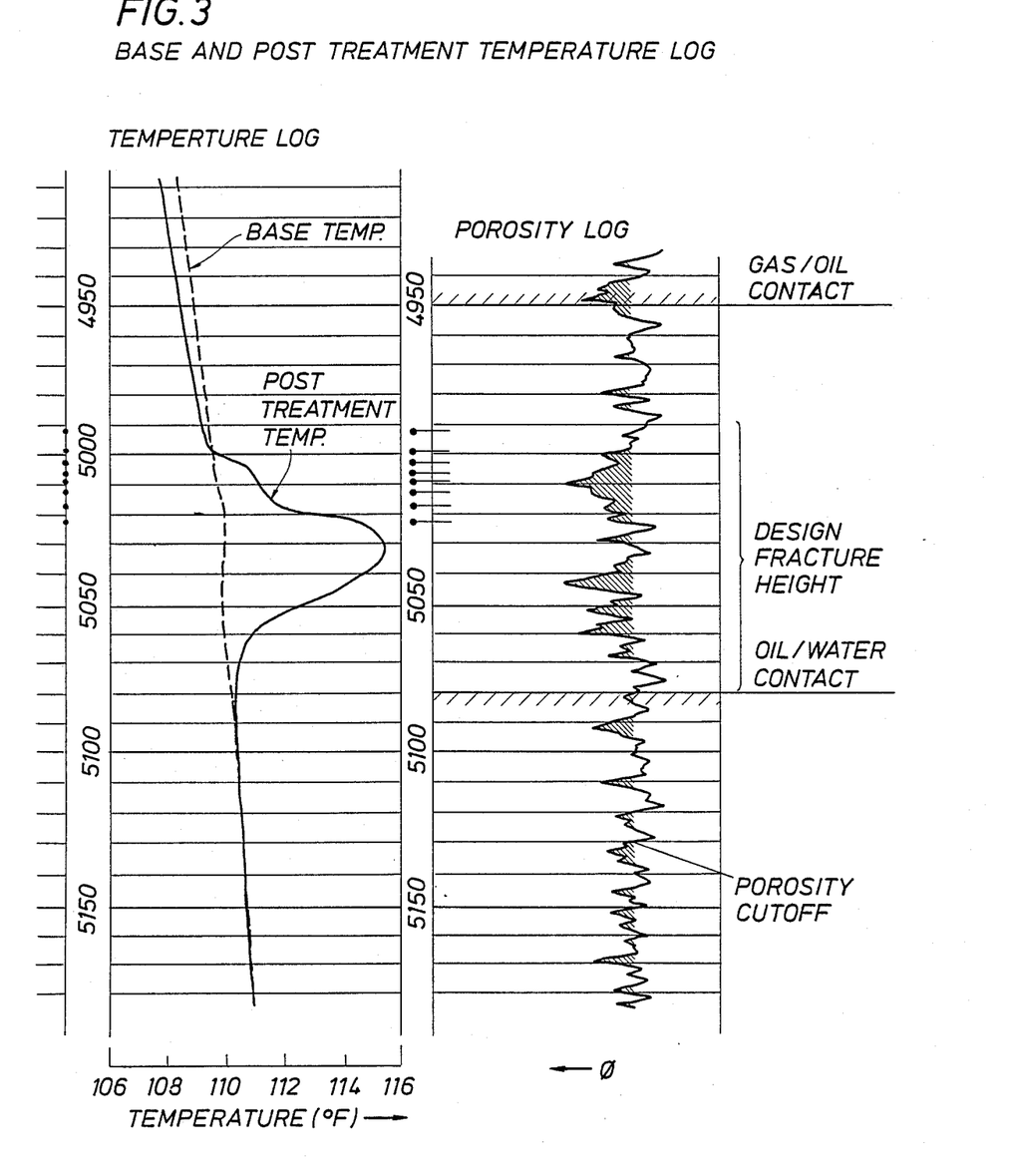
FIG. 3 is a post-stimulation temperature log, alongside a porosity log from the same well.

FIG. 3 shows the results of a stimulation treatment made using the present method. The post-stimulation temperature log shows that the created fracture height was about 94 feet, which is very close to the design value of 90 feet. The well described in this example was a new well in an existing field, which was stimulated prior to being placed in service. It was compared with a similar new well in the same field, which was also stimulated prior to service, but with a conventional stimulation process (alternated stages of gelled water and gelled acid). The stabilized production rate of the example well was 148 barrels of oil per day (BOPD), compared to a stabilized production rate of 83 BOPD for the other new well.

The results from stimulating 22 wells using the equilibrium fracture acidizing treatment process were compared with the results from stimulating 165 wells using conventional fracture acidizing techniques over the same time period. The conventional techniques included large acid volumes pumped continuously at fracturing rates, large acid volumes pumped in stages at fracturing rates with intermittent shut-downs to allow fracture closure, large acid volumes diverted from zone to zone by water-soluble solids, and small acid volumes pumped in a single stage at fracturing rates. All but two of the wells stimulated with the equilibrium fracture acidizing technique exhibited increased production (a success rate of 91%), with increases ranging from 2 to 235 barrels of oil per day (BOPD), an average increase of 36 BOPD, and a median increase of 25–27 BOPD. Of the wells stimulated with conventional methods, 134 exhibited increased production (a success rate of 81%), with increases ranging from 1 to 170 BOPD, an average increase of 22 BOPD, and a median increase of 14 BOPD. Also, the cost per barrel of oil increase for the equilibrium fracture acidizing treatments was only 83% of the cost per barrel of oil increase for the conventional fracture acidizing treatments. The larger increases in production at a lower cost clearly show the superiority of the equilibrium fracture acidizing process compared to conventional fracture acidizing techniques.

Various modifications of the present invention will become apparent to those skilled in the art from the foregoing description. Such modifications are intended to fall within the scope of the appended claims.

What is claimed is:

1. A method for acidizing a formation penetrated by a well comprising:
   injecting acid into the formation at a pressure sufficient to initiate and propagate a fracture in the formation;
   reducing the injection rate of the acid into the fracture to a rate sufficient to hold the fracture open without significant further extension, such that the acid contacts and etches the fracture ; and
   reducing the injection rate of the acid into the fracture to a rate that is insufficient to hold the fracture open.

2. A method for acidizing a formation penetrated by a well, by fracturing the formation and then holding the fracture open without significant extension while the fracture is acidized , comprising:
   injecting acid into the formation at a pressure sufficient to initiate and propagate the fracture in the formation;
   reducing the pressure on the fracture to a level below the propagation pressure but above the pressure at which the fracture will close, such that the acid contacts and etches
   the fracture ; and
   reducing the pressure on the fracture to a level below the pressure at which the fracture will close.

3. A method for acidizing a formation penetrated by a well, by fracturing the formation and then holding the fracture open without significant extension while the fracture is acidized, comprising:

injecting acid into the formation at a rate sufficient to initiate and propagate the fracture in the formation;

reducing the injection rate of the acid into the fracture to a rate sufficient to replace any fluid which leaks off from the fracture, such that the acid contacts and etches the fracture ; and reducing the injection rate of the acid into the fracture to a rate that is insufficient to replace the fluid leaking off from the fracture, thereby allowing the fracture to close.

4. A method for acidizing a formation penetrated by a well comprising:

injecting a fracturing fluid into the formation at a pressure sufficient to initiate and propagate a fracture in the formation;

reducing the injection rate of fracturing fluid into the fracture to a rate sufficient to hold the fracture open without significant further extension;

injecting acid into the fracture at a rate sufficient to hold the fracture open without significant further extension, such that the acid contacts and etches the fracture; and reducing the injection rate of the acid into the fracture to a rate that is insufficient to hold the fracture open.

5. A method for acidizing a formation penetrated by a well, by fracturing the formation and then holding the fracture open without significant extension while the fracture is acidized , comprising:

injecting a fracturing fluid into the formation at a pressure sufficient to initiate and propagate the fracture in the formation;

reducing the pressure on the fracture to a level below the propagation pressure but above the pressure at which the fracture will close;

injecting acid into the fracture at a pressure below the propagation pressure but above the closure pressure , such that the acid contacts and etches the fracture ; and reducing the pressure on the fracture to a level below the closure pressure.

6. A method for acidizing a formation penetrated by a well, by fracturing the formation and then holding the fracture open without significant extension while the fracture is acidized , comprising:

injecting a fracturing fluid into the formation at a rate sufficient to initiate and propagate the fracture in the formation;

reducing the injection rate of the fracturing fluid to a rate sufficient to replace any fluid which leaks off from the fracture;

injecting acid into the fracture at a rate sufficient to replace any fluid which leaks off from the fracture, such that the acid contacts and etches the fracture ; and reducing the injection rate of the acid into the fracture to a rate that is insufficient to replace the fluid leaking off from the fracture, thereby allowing the fracture to close.

7. The method of any one of claims 4, 5, or 6 wherein the fracturing fluid is selected from the group consisting of water, gelled water, hydrocarbon-in-water emulsions, water-in-hydrocarbon emulsions, gelled hydrocarbons, high viscosity hydrocarbon liquids, carbon dioxide foam, nitrogen foam, and mixtures thereof.

8. The method of any one of claims 1, 2, 3, 4, 5, or 6 wherein the acid is selected from the group consisting of aqueous solutions of acetic acid, citric acid, formic acid, hydrochloric acid, hydroflouric acid, and mixtures thereof.

9. The method of any one of claims 1, 2, 3, 4, 5, or 6 wherein the acid is selected from the group consisting of retarded acid and gelled acid.

10. A method for creating flow channels in a formation penetrated by a well comprising:

injecting a fracturing fluid into the formation at a pressure sufficient to initiate and propagate the fracture in the formation;

reducing the injection rate of fracturing fluid into the fracture to a rate sufficient to hold the fracture open without significant further extension;

injecting a fluid suspension of propping agent into the fracture at a rate sufficient to hold the fracture open without significant extension; and reducing the injection rate of the fluid suspension of propping agent into the fracture to a rate that allows the fracture to close on the fluid suspension of propping agent, such that the flow channels result.

11. A method for creating flow channels in a formation penetrated by a well, by fracturing the formation and then holding the fracture open without significant extension while a fluid suspension of propping agent is placed in the fracture, comprising:

injecting a fracturing fluid into the formation at a pressure sufficient to initiate and propagate the fracture in the formation;

reducing the pressure on the fracture to a level below the propagation pressure but above the pressure at which the fracture will close;

injecting the fluid suspension of propping agent into the fracture at a pressure below the propagation pressure but above the closure pressure; and reducing the pressure on the fracture below the closure pressure, thereby allowing the fracture to close on the fluid suspension of propping agent, such that the flow channels result.

12. A method for creating flow channels in a formation penetrated by a well, by fracturing the formation and then holding the fracture open without significant extension while a fluid suspension of propping agent is placed in the fracture, comprising:

injecting a fracturing fluid into the formation at a rate sufficient to initiate and propagate the fracture in the formation;

reducing the injection rate of the fracturing fluid to a rate sufficient to replace any fluid which leaks off from the fracture;

injecting the fluid suspension of propping agent into the fracture at a rate sufficient to replace any fluid which leaks off from the fracture; and reducing the injection rate of the fluid suspension into the fracture to a rate that allows the fracture to close on the fluid suspension of propping agent, such that the flow channels result.

13. The method of any one of claims 10, 11, or 12 wherein the fracturing fluid is a fluid suspension of a propping agent.

14. The method of any one of claims 10, 11, or 12 which includes the additional step of injecting acid into the formation, after the fracture is allowed to close on the propping agent, such that the flow channels created by the propping agent are enlarged and additional flow channels are etched in the formation.

15. The method of any one of claims 10, 11, or 12 wherein the propping agent is selected from the group consisting of sand, bauxite, glass beads, metal shot, plastic particles, resin-coated particles, walnut hulls, intermediate strength proppants, and mixtures thereof.

16. A method for placing a flow-enhancing fluid within a formation penetrated by a well, comprising:
injecting a fracturing fluid into the formation at a pressure sufficient to initiate and propagate the fracture in the formation;
injecting the flow-enhancing fluid into the fracture at a lower rate sufficient to hold the fracture open without significant extension; and
reducing the injection rate of the flow-enhancing fluid into the fracture to a rate that is insufficient to hold the fracture open.

17. A method for placing a fluid within a formation penetrated by a well, by fracturing the formation and then holding the fracture open without significant extension while the fluid is placed in the fracture, comprising:
injecting a fracturing fluid into the formation at a pressure sufficient to initiate and propagate the fracture in the formation;
reducing the pressure on the fracture to a level below the propagation pressure but above the pressure at which the fracture will close;
injecting a flow-enhancing fluid into the fracture, while maintaining the pressure on the fracture below the propagation pressure but above the closure pressure ; and
reducing the pressure on the fracture to a level below the closure pressure.

18. A method for placing a fluid within a formation penetrated by a well, by fracturing the formation and then holding the fracture open without significant extension while a fluid is placed in the fracture, comprising:
injecting a fracturing fluid into the formation at a rate sufficient to initiate and propagate the fracture in the formation;
reducing the injection rate of the fracturing fluid to a rate sufficient to replace any fluid which leaks off from the fracture;
injecting a flow-enhancing fluid into the fracture at a rate sufficient to replace any fluid which leaks off from the fracture
injecting a flow-enhancing fluid into the fracture at a rate sufficient to replace any fluid which leaks off from the fracture; and
reducing the injection rate of the flow-enhancing fluid into the fracture to a rate that is insufficient to replace the fluid leaking off from the fracture, thereby allowing the fracture to close.

19. The method of any one of claims 16, 17, or 18 wherein the flow-enhancing fluid is selected from the group consisting of paraffin inhibitors, scale inhibitors, and mixtures thereof.

20. A method for creating flow channels in a formation penetrated by a well, by fracturing the formation and then holding the fracture open without significant extension, comprising:
injecting a fracturing fluid into the formation at a pressure sufficient to initiate and propagate the fracture in the formation;
reducing the pressure on the fracture to a level below the propagation pressure but above the pressure at which the fracture will close;
injecting a fluid suspension of propping agent into the fracture at a pressure below the propagation pressure but above the closure pressure;
injecting acid into the fracture, such that the acid contacts and etches the flow channels in the fracture while maintaining the pressure on the fracture below the propagation pressure but above the closure pressure;
injecting a flow-enhancing fluid into the fracture, while maintaining the pressure on the fracture below the propagation pressure but above the closure pressure; and
reducing the pressure on the fracture to a level below the closure pressure, thereby allowing the fracture to close on the propping agent, such that the flow channels result.

21. A method for acidizing a fractured formation penetrated by a well comprising:
injection acid into the formation at a pressure sufficient to reopen and hold the fracture open without significant further extension, such that the acid contacts and etches the fracture ; and
reducing the injection rate of the acid into the fracture to a rate that is insufficient to hold the fracture open.

22. A method for acidizing a fractured formation penetrated by a well, by reopening the fracture and then holding the fracture open without significant extension while the fracture is acidized , comprising:
injecting acid into the formation at a pressure below the pressure at which the fracture will propagate, but above the pressure at which the fracture will reopen such that the acid contacts and etches the fracture ; and
reducing the injection rate of the acid into the fracture to a rate that is insufficient to hold the fracture open.

23. A method for creating flow channels in a fractured formation penetrated by a well, by reopening the fracture and then holding the fracture open without significant extension while the flow channels are etched, comprising:
injecting acid into the formation at a rate sufficient to reopen the fracture in the formation; and
reducing the injection rate of the acid into the fracture to a rate sufficient to replace any fluid which leaks off from the fracture, 24. A method for acidizing a fractured formation penetrated by a well comprising:
injecting a fracturing fluid into the formation at a pressure sufficient to reopen and hold the fracture open without significant further extension;
injecting acid into the fracture at a rate sufficient to hold the fracture open without significant further extension, such that the acid contacts and etches ; and
reducing the injection rate of the acid into the fracture to a rate that is insufficient to hold the fracture open.

25. A method for acidizing a fractured formation penetrated by a well, by reopening the fracture and then holding the fracture open without significant extension while the fracture is acidized , comprising:
injecting a fracturing fluid into the formation at a pressure below the pressure at which the fracture will propagate, but above the pressure at which the fracture will reopen;

injecting acid into the fracture at a pressure below the propagation pressure but above the reopening pressure, such that the acid contacts and etches the fracture; and reducing the injection rate of the acid into the fracture to a rate that is insufficient to hold the fracture open.

26. A method for creating flow channels in a fractured formation penetrated by a well, by reopening the fracture and then holding the fracture open without significant extension while the flow channels are etched, comprising:

injecting a fracturing fluid into the formation at a rate sufficient to reopen the fracture in the formation;

reducing the injection rate of the fracturing fluid to a rate sufficient to replace any fluid which leaks off from the fracture; and injecting acid into the fracture at a rate sufficient to replace any fluid which leaks off from the fracture, such that the acid contacts and etches the flow channels in the fracture.

27. The method of any one of claims 24, 25, or 26 wherein the fracturing fluid is selected from the group consisting of water, gelled water, hydrocarbon-in-water emulsions, water-in-hydrocarbon emulsions, gelled hydrocarbons, high viscosity hydrocarbon liquids, carbon dioxide foam, nitrogen foam, and mixtures thereof.

28. The method of any one of claims 21, 22, 23, 24, 25, or 26 wherein the acid is selected from the group consisting of aqueous solutions of acetic acid, citric acid, formic acid, hydrochloric acid, hydroflouric acid, and mixtures thereof.

29. The method of any one of claims 21, 22, 23, 24, 25, or 26 wherein the acid is selected from the group consisting of retarded acid and gelled acid.

30. A method for creating flow channels in a fractured formation penetrated by a well comprising:

injecting a fracturing fluid into the formation at a pressure sufficient to reopen and hold the fracture open without significant further extension;

injecting a fluid suspension of propping agent into the fracture at a rate sufficient to hold the fracture open without significant extension; and reducing the injection rate of the fluid suspension of propping agent into the fracture to a rate that allows the fracture to close on the fluid suspension of propping agent, such that the flow channels result.

31. A method for creating flow channels in a fractured formation penetrated by a well, by reopening the fracture and then holding the fracture open without significant extension while a fluid suspension of propping agent is placed in the fracture, comprising:

injecting a fracturing fluid into the formation at a pressure below the pressure at which the fracture will propagate, but above the pressure at which the fracture will reopen;

injecting the fluid suspension of propping agent into the fracture at a pressure below the propagation pressure but above the reopening pressure; and reducing the pressure on the fracture below the closure pressure, thereby allowing the fracture to close on the fluid suspension of propping agent, such that the flow channels result.

32. A method for creating flow channels in a fractured formation penetrated by a well, by reopening the fracture and then holding the fracture open without significant extension while a fluid suspension of propping agent is placed in the fracture, comprising:

injecting a fracturing fluid into the formation at a rate sufficient to reopen the fracture in the formation;

reducing the injection rate of the fracturing fluid to a rate sufficient to replace any fluid which leaks off from the fracture;

injecting the fluid suspension of propping agent into the fracture at a rate sufficient to replace any fluid which leaks off from the fracture; and allowing the fracture to close on the propping agent, such that the flow channels result.

33. The method of any one of claims 30, 31, or 32 wherein the fracturing fluid is a fluid suspension of a propping agent.

34. The method of any one of claims 30, 31, or 32 which includes the additional step of injecting acid into the formation, after the fracture is allowed to close on the propping agent, such that the flow channels created by the propping agent are enlarged and additional flow channels are etched in the formation.

35. The method of any one of claims 30, 31, or 32 wherein the propping agent is selected from the group consisting of sand, bauxite, glass beads, metal shot, plastic particles, resin-coated particles, walnut hulls, intermediate strength proppants, and mixtures thereof.

36. A method for placing a flow-enhancing fluid within a fractured formation penetrated by a well, comprising:

injecting a fracturing fluid into the formation at a pressure sufficient to reopen and hold the fracture open without significant further extension;

injecting the flow-enhancing fluid into the fracture at a rate sufficient to hold the fracture open without significant extension; and reducing the injection rate of the flow-enhancing fluid into the fracture to a rate that is insufficient to hold the fracture open.

37. A method for placing a fluid within a fractured formation penetrated by a well, by reopening the fracture and then holding the fracture open without significant extension while a fluid is placed in the fracture, comprising:

injecting a fracturing fluid into the formation at a pressure below the pressure at which the fracture will propagate, but above the pressure at which the fracture will reopen;

injecting a flow-enhancing fluid into the fracture at a pressure below the propagation pressure but above the reopening pressure ; and reducing the injection rate of the flow-enhancing fluid into the fracture to a rate that is insufficient to hold the fracture open.

38. A method for placing a fluid within a fractured formation penetrated by a well, by reopening the fracture and then holding the fracture open without significant extension while a fluid is placed in the fracture, comprising:

injecting a fracturing fluid into the formation at a rate sufficient to reopen the fracture in the formation;

reducing the injection rate of the fracturing fluid to a rate sufficient to replace any fluid which leaks off from the fracture; and injecting a flow-enhancing fluid into the fracture at a rate sufficient to replace any fluid which leaks off from the fracture.

39. The method of any one of claims 36, 37, or 38 wherein the flow-enhancing fluid is selected from the group consisting of paraffin inhibitors, scale inhibitors, and mixtures thereof.

40. A method for creating flow channels in a fractured formation penetrated by a well, by reopening the fracture and then holding the fracture open without significant extension, comprising:

injecting a fracturing fluid into the formation at a pressure sufficient to reopen and hold the fracture open without significant further extension;

injection a fluid suspension of propping agent into the fracture, while maintaining the pressure on the fracture below the propagation pressure but above the reopening pressure;

injecting acid into the fracture, such that the acid contacts and etches the flow channels in the fracture while maintaining the pressure on the fracture below the propagation pressure but above the reopening pressure;

injecting a flow-enhancing fluid into the fracture propagation pressure but above the reopening pressure; and reducing the pressure on the fracture to a level below the closure pressure, thereby allowing the fracture to close on the propping agent, such that the flow channels result.

* * * * *